(12) United States Patent
Sighart et al.

(10) Patent No.: US 7,756,880 B2
(45) Date of Patent: Jul. 13, 2010

(54) METHOD OF PROVIDING CONTENT ITEMS

(75) Inventors: Harald Sighart, Antering (AT); Ruben Inoto, Salzburg (AT); Christian Weiler, Salzburg (AT); Rainer Burgstaller, Salzburg (AT)

(73) Assignee: RealNetworks GmbH, Salzburg (AT)

( * ) Notice: Subject to any disclaimer, the term of this patent is extended or adjusted under 35 U.S.C. 154(b) by 120 days.

(21) Appl. No.: 11/540,578

(22) Filed: Oct. 2, 2006

(65) Prior Publication Data

US 2007/0106672 A1 May 10, 2007

(30) Foreign Application Priority Data

Nov. 8, 2005 (EP) .................................. 05024286

(51) Int. Cl.
*G06F 7/06* (2006.01)
(52) U.S. Cl. ....................................... 707/751; 707/752
(58) Field of Classification Search .................... 707/5, 707/6, 104.1; 705/35
See application file for complete search history.

(56) References Cited

U.S. PATENT DOCUMENTS

| 5,571,997 | A |  | 11/1996 | Gray et al. |
| 5,616,876 | A | * | 4/1997 | Cluts .......................... 84/609 |
| 5,749,081 | A |  | 5/1998 | Whiteis |
| 5,790,102 | A |  | 8/1998 | Nassimi |
| 6,108,493 | A |  | 8/2000 | Miller et al. |
| 6,118,431 | A |  | 9/2000 | Terrier et al. |
| 6,421,675 | B1 |  | 7/2002 | Ryan et al. |
| 6,438,579 | B1 |  | 8/2002 | Hosken |
| 6,583,795 | B1 | * | 6/2003 | Ohyama .................... 715/785 |
| 6,999,962 | B2 | * | 2/2006 | Julliard et al. ................ 707/10 |
| 7,003,515 | B1 | * | 2/2006 | Glaser et al. .................... 707/5 |
| 7,158,986 | B1 | * | 1/2007 | Oliver et al. ................ 707/102 |

(Continued)

FOREIGN PATENT DOCUMENTS

JP 9-244801 9/1997

(Continued)

OTHER PUBLICATIONS

Segusoland, http://segusoland.sourceforge.net/hig.html, Feb. 19, 2004.*

(Continued)

*Primary Examiner*—Tim Vo
*Assistant Examiner*—Gary J Koo
(74) *Attorney, Agent, or Firm*—Kory D. Christensen; Stoel Rives LLP

(57) ABSTRACT

A method provides content items located on a server to a client, the server being able to communicate with the client via a communication network. The method includes generating a content recommendation list comprising several content recommendation list entries in dependence on a user feedback profile, each content recommendation list entry representing a content item, and transferring the content recommendation list from the server to the client. The method also includes providing a representation of the content recommendation list entries through a client user interface, each entry being selectable and arranged such that for each entry, user feedback may be generated and corresponding user feedback information sent to the server and that upon selection of an entry at a predetermined position in the content recommendation list, a recommendation list request is transferred to the server.

20 Claims, 10 Drawing Sheets

U.S. PATENT DOCUMENTS

| | | |
|---|---|---|
| 2002/0010759 A1* | 1/2002 | Hitson et al. ............... 709/219 |
| 2002/0032019 A1 | 3/2002 | Marks et al. |
| 2002/0068525 A1 | 6/2002 | Brown et al. |
| 2002/0104087 A1 | 8/2002 | Schaffer et al. |
| 2002/0109718 A1* | 8/2002 | Mansour et al. ............. 345/744 |
| 2002/0116291 A1 | 8/2002 | Grasso et al. |
| 2002/0133247 A1 | 9/2002 | Smith et al. |
| 2002/0138456 A1 | 9/2002 | Levy et al. |
| 2002/0139842 A1 | 10/2002 | Swaine |
| 2002/0154157 A1* | 10/2002 | Sherr et al. ................ 345/716 |
| 2002/0178440 A1 | 11/2002 | Agnihotri et al. |
| 2003/0051240 A1 | 3/2003 | Schaffer et al. |
| 2003/0074447 A1 | 4/2003 | Rafey et al. |
| 2003/0089218 A1* | 5/2003 | Gang et al. .................. 84/615 |
| 2003/0126600 A1 | 7/2003 | Heuvelman |
| 2005/0198015 A1* | 9/2005 | Sezan et al. .................... 707/3 |

FOREIGN PATENT DOCUMENTS

| | | |
|---|---|---|
| WO | WO 01/06398 A2 | 1/2001 |
| WO | WO 01/15449 A1 | 3/2001 |
| WO | WO 01/35667 | 5/2001 |
| WO | WO 01/91417 | 11/2001 |
| WO | WO 02/03227 | 1/2002 |
| WO | WO 02/05140 | 1/2002 |

OTHER PUBLICATIONS

Office Action in U.S. Appl. No. 10/861,154, mailed Nov. 1, 2006.
Office Action in U.S. Appl. No. 10/861,154, mailed May 3, 2006.
Office Action in U.S. Appl. No. 10/861,133, mailed Jan. 22, 2007.
Office Action in U.S. Appl. No. 10/861,133, mailed Jul. 7, 2006.

* cited by examiner

METHOD OF PROVIDING CONTENT ITEMS

TECHNICAL FIELD

The invention relates to a method of providing content items located on a server to a client as well as a client-server system adapted to provide content items located on the server to the client.

BACKGROUND

Searching for data via the internet has become part of the daily life. Since the amount of data which can be accessed by a user over the internet has been steadily increased during the last years, content recommendation systems have been developed which facilitate the process of searching and accessing specific data.

Generally, a content recommendation system works as follows: First, a user is provided with a first selection of content items by the content recommendation system. Second, feedback is given by the user indicating which of the content items of the first selection he likes/dislikes. Third, the content recommendation system generates a second selection of content items based on the feedback given by the user. The second and third step may be repeated several times.

Known content recommendation systems often need a considerable amount of time to generate requested selections of content items. Further, the selections of content items offered by the content recommendation systems may not be satisfying for the user, in particular if the user contacts the recommendation device for the first time and therefore no user profile exists.

SUMMARY OF THE INVENTION

It is an objective of the present invention to provide a recommendation method/recommendation system which avoids the disadvantages mentioned above.

In order to solve this objective, the present invention provides a method of providing content items according to claim 1. Further, the present invention provides a client-server system according to claim 18. Preferred embodiments of the present invention are defined in the subclaims.

According to the present invention, a method of providing content items located on a server to a client, the server being able to communicate with the client via a communication network, comprises the following steps:

a) transferring a first content recommendation list request from the client to the server, b) generating a first content recommendation list comprising several content recommendation list entries at the server in dependence on a user feedback profile, each content recommendation list entry representing a content item, c) transferring the first content recommendation list from the server to the client, d) providing a visual and/or audible representation of the first content recommendation list entries through a client user interface, each entry being selectable and arranged such that for each entry, user feedback may be generated and corresponding user feedback information sent to the server and that upon selection of an entry (preferably freely adjustable by the client) at a predetermined position in the first content recommendation list, a second recommendation list request is transferred to the server, e) generating at the server, a second content recommendation list in dependence on the user feedback profile and also, if received, in dependence on the user feedback information, and f) transferring the second content recommendation list from the server to the client in response to the second recommendation list request and providing a visual and/or audible representation of the second content recommendation list entries through the client user interface, wherein the client initiates at least one transfer process of content items from the server to the client based on user selections of content recommendation list entries, and wherein the second content recommendation list is prepared at the server in advance of receiving the second recommendation list request from the client.

In an embodiment of the present invention, the transfer processes of content items from the server to the client initiated by the client are streaming processes. Alternatively, the transfer processes may be download processes or a combination of streaming processes and download processes. The present invention is in particular useful when applied to streaming processes.

In the scope of the present invention, the term "selection (of a content recommendation list entry)" can be classified into two categories: "explicit selection" and "implicit selection". If the content recommendation list entries are visually presented to the user, "implicit selection" may in particular mean highlighting a content recommendation list entry (which is for example performed by simply scrolling through the list of recommendation list entries, thereby successively highlighting one of the recommendation list entries), whereas "explicit selection" may in particular mean touching a content recommendation list entry displayed or already highlighted (i.e. implicitly selected) using a touch screen, a mouse pointer or buttons being part of the user interface, respectively. The selection of a particular content recommendation list entry may also be performed using a corresponding button of the user interface assigned to the content recommendation list entry (i.e. a highlighting is not necessary). If the content recommendation list entries are visually presented to the user, the transfer process of content items from the server to the client may only be initiated if content recommendation list entries have been explicitly selected. Alternatively, the transfer processes may already be initiated if content recommendation list entries have been implicitly selected (for example, a transfer process may be initiated if the user highlights an content recommendation list entry for a predetermined time like five seconds ("automatical" initiation)).

If the content recommendation list entries are audibly presented to the user (for example by loudspeakers telling the user what content recommendation list entries are available), the transfer process of content items from the server to the client may be initiated by a user speech input or by using a touch screen, a mouse pointer or buttons being part of the user interface, respectively.

In the scope of the present invention, the selection process may be part of a rating process (in order to rate a content recommendation list entry, it has to be selected in advance) or be interpreted as rating process (for example initiating a transferring process of a content item from the server to the client by means of explicit selection means that the user likes the content item and can therefore be regarded as rating). "Rating" (of a content recommendation list entry) can be classified into two categories: "explicit rating" and "implicit rating". Explicit rating may for example be pressing a button "like/dislike" in order to indicate that a content recommendation list entry (or the artist, mood, genre, decade, etc. associated with this content recommendation list entry) currently highlighted is appreciated/not appreciated. Implicit rating may for example be the fact that a user did initiate/did not initiate ("skip") a transfer process of a particular content item represented by a respective displayed content recommendation list entry (explicit/implicit selection), the speed he scrolls through visually displayed content recommendation list entries ("skip"), and the like.

As has become apparent above, explicit/implicit selection of a content recommendation list entry may be interpreted as explicit and/or implicit rating, whereas explicit/implicit rating does not necessarily imply explicit/implicit selection (the fact that a user likes a content item does not necessarily mean that he wants to consume it). The feedback created by the user may both result from selection processes and rating processes.

As already mentioned, the term "upon selection of an entry at a predetermined position in the first content recommendation list" means selecting an entry of the first content recommendation list, said selection initiating the sending of the second recommendation list request from the client to the server. The position may be individually determined within each client. For example, the second recommendation list request may be sent after the user has highlighted the third content recommendation list entry displayed, or the last content recommendation list entry displayed (regardless whether content item transferring processes have been initiated or not).

Further, the present invention provides a client-server system adapted to provide content items located on the server to the client, the server being able to communicate with the client via a communication network, comprising:

a) a client transmission interface controlled to transfer a first content recommendation list request from the client to the server, b) a server processor operable to generate a first content recommendation list comprising several content recommendation list entries in dependence on a user feedback profile, each content recommendation list entry representing a content item, c) a server transmission interface controlled to transfer the first content recommendation list from the server to the client, d) a client processor operable to provide a visual and/or audible representation of the first content recommendation list entries through a client user interface, each entry being selectable for a user, the client processor having the ability to generate user feedback on the selectable content recommendation list entries under the control of the user and to send corresponding feedback information to the server, wherein upon selection of an entry at a predetermined position in the first content recommendation list by the user, a second recommendation list request is transferred to the server, e) the server processor further operable to generate a second content recommendation list in dependence on the user feedback profile and also, if received, in dependence on the user feedback information, and f) the server transmission interface further controlled to transfer the second content recommendation list from the server to the client in response to the second recommendation list request and providing a visual and/or audiable representation of the second content recommendation list entries through the client user interface, wherein the client initiates at least one transfer process of content items from the server to the client based on user selections of recommendation list entries, and wherein the second content recommendation list is prepared at the server in advance of receiving the second recommendation list request from the client.

In the scope of the present invention, the term "server" may be interpreted as content recommendation system, whereas the term "client" may be interpreted as device used to contact the content recommendation system via the communication network. The client may for example be a mobile phone, a handheld device, a PC, a PDA (Personal Digital Assistant), a games console, or any other networkable device. The client and server are connectable via a network. The network may be wired and/or wireless. The connection may be "always on" (such as with a DSL connection) or may be fleeting (such as with a dial-up connection). Suitable networks/interconnections may include the Internet, intranets, extranets, VPN (Virtual Private Networks), xDSL connections, telephony networks (including GSM/EDGE, 3 G (e.g. UMTS), 4 G, GPRS, WAP), wireless Ethernet or broadcasting networks.

Within the scope of the present invention, the term of "content item" includes any kind of data which can be transferred via a communication network, for example audio data, video data, A/V data, still images or moving images, text data (e.g. articles), program data (games), or the like.

The present invention enables high speed content recommendation, i.e. content can be recommended immediately after the user requested it. This results from the fact that transferring the user feedback from the client to the server and/or generating a second content recommendation list on the server in dependence on the user feedback is carried out before a further content recommendation list request is transferred from the client to the server. In other words: The user feedback is supplied back to the server as soon as possible. Further, the server generates the new content recommendation list based upon the user feedback as soon as possible, so that the new content recommendation list is already prepared when the next content recommendation list request is received by the server. In contrast, known content recommendation systems expect to receive user feedback together with the respective content recommendation list request so that extra time for preparing the new content recommendation list is needed. As a result, a time delay occurs between the reception of the content recommendation list request and the process of transferring the new content recommendation list from the server to the client.

A further advantage of the present invention is that the immediate reaction of the server upon reception of a content recommendation list request enables the amount of content recommendation list entries which are transferred from the server to the client to be reduced to a minimum (the user does not experience a significant delay of time between the process of transferring a content recommendation list request from the client and the sever and the process of transferring a corresponding content recommendation list from the server to the client; therefore, it makes no difference whether a specific quantity of content recommendation list entries are transferred from the server to the client within one transferring step or within several transferring steps). As a consequence the "quality" of the content items recommended converge faster to the user's wishes (the more often content recommendation lists are transferred from the server to the client, the faster the content items will meet the requirements (the taste) of the user since the user is able to determine whether the reaction of the content recommendation system on his feedback has been considered in the right way).

In an embodiment of the present invention, said first content recommendation list and said second content recommendation list are parts of one overall content recommendation list which is stored on the server and maintained in dependence on the user feedback information received by the server.

In an embodiment of the present invention, the server stores first recommendation list information relating to content recommendation lists already transferred from the server to the client and/or second recommendation list information relating to content recommendation lists to be transferred from the server to the client, wherein the first content recommendation list information and the second content recommendation list information are part of content recommendation list information relating to the overall content recommendation list. Advantageously, the second recommendation list information relating to content recommendation lists to be transferred from the server to the client is updated in dependence on the user feedback each time feedback is transferred from the client to the server. The generation of the second recommendation list information relating to content recommendation lists to be transferred from the server to the client may be based upon the user feedback transferred from the client to the server and on the first recommendation list information relating to content recommendation lists already transferred from the server to the client.

In the light of the embodiments of the last paragraph, the term "user feedback profile" may in particular mean the first recommendation list information, the second recommendation list information (which are created in response to user feedback) as well as the "actual" feedback. In case that no user feedback profile exists so far ("empty" user feedback profile) which may happen if a user requests for content recommendation for the first time, two scenarios are possible: First, instead of a "personal" user feedback profile, a pre-stored "general" profile may be used at beginning (which may for example reflect the "average" taste of different users which have already requested for content recommendation and given feedback). Second, the user may provide initial information like a music genre (for example rock or pop or jazz) he likes, one or several music artists he likes, the mood of the music he wants to listen to, the decade into which the music should fall, and the like. This information may for example be supplied to the server together with the first content recommendation list request. After having received the first content recommendation list, all further recommendation may then be generated on the basis of the "actual" personal user feedback which is collected within the user feedback profile.

In the following, a preferred embodiment of the present invention will be described, assuming that the content items are songs.

Online content recommendation systems are known. To create a recommendation list of content items, the recommendation system may need to retrieve relevant documents from a large catalogue according to a user profile.

To create the recommendation list, the recommendation system may not be able to instantaneously (<1 sec) provide (update) the recommendation list, for example a song list. In addition, the recommendation list is transferred from a server to a device (client). The time to transfer the recommendation list may be limited by bandwidth restrictions common to mobile phone networks (GSM). Therefore, delays occur.

The present invention overcomes these difficulties by storing a recommendation list corresponding to a particular playlist of a user on the server. This storage enables to immediately provide recommendations to the client even if the recommendation list is updated at the server with delay. In addition, the system enables to store a part of the playlist on the device (client). If this temporally stored list of recommendations becomes short, the device queries new recommendations in form of a background process while continuously content items are continuously transferred to the user (foreground process).

Thus, the present invention provides "personal radio" available on a network enabled device (mobile phone, pc, etc.). The personal radio is realized by a system comprising the device (client), a central manager (server), a recommender (server) and a streamer (server). To enable a continuous listening experience, delays to create a playlist by the recommender and delays to deliver the playlists and content streams to the device are taken into account: The system according to the present invention buffers one part of the playlist on the device (client), another part on the server and optionally concatenates the songs of a playlist on the server before transferring (streaming) them to the device in order to reduce these delays.

As already mentioned, the system according to the present invention comprises a device (networked enabled device such as mobile phone, network media receiver, pc, game console, etc. a consumer interacts with), a manager (central system component managing the needs of the consumers and personal radio stations (=channels)), a recommender (central system component making suggestions based on user input and user feedback), and a streamer (specialized server delivering data streams over a network to the device (standard using RTP/RTSP)).

In order to realize this, a channel buffer (component of server providing storage for the playlists of individual users) is implemented on the manager, and a client cache (component of the device that enables to store a part of a playlist on the device) is implemented on the device, thereby obtaining a client server buffer system for a personal radio station. To enable the personal radio station, a dynamic playlist is maintained on the manager. A portion of the playlist is available for the user on the device.

To create a personal radio station on the mobile phone, a consumer may for example select a genre and/or decade. In response thereto, the user receives recommendations. The user may then give explicit feedback (like/dislike or star-ratings) on the recommendations to "personalize" the recommendation.

Alternatively, a user may select one or more songs recommended and search for similar songs. In addition to ratings, skip events and playtime may also be used to personalize the station. The personalization is reflected by the user profile which changes during the process of personalization.

The cache on the client has the ability to recursively check its size. If the size of the cache (e.g. number of songs in the cache) is below a certain threshold (=limit), the cache contacts the manager to retrieve additional items (they are retrieved from the buffer on the manager). The buffer on the manager is also capable of monitoring its size. If size (e.g. number of songs) is below a threshold (=limit), the manager calls the recommender to make additional recommendations. The recommended items are added to the buffer.

The list of songs (recommendation list) provided by the manager for the personal radio station of a user can be interpreted as playlist. Each individual personal radio station is called channel.

A subset of the playlist (partial playlist) is available on the client similar to a table of content of a book. The content itself is actually stored with and provided by the streamer.

According to an embodiment of the present invention, the streamer provides multiple partial playlists for an individual channel. Each partial playlist is identified by a unique URL.

Alternatively, the streamer may provide only one single URL that enables access to all songs for an individual channel.

According to an embodiment of the present invention, the manager updates the playlists stored within its channel buffer. Alternatively, the streamer may manage the individual channels of the users.

According to an embodiment of the present invention, artist name, song title, etc. are provided by the manager. Alternatively, a file on the streamer accessible under the unique URL containing all songs for an individual channel may include a reference to a site where this information can be found or may embed this information.

According to the present invention, delays concerning a) the creation of music suggestions by the recommender, b) network delays occurring when transmitting a playlist from the manager to the device, and c) network delays occurring when transmitting streams from the streamer to the device by concatenating songs in the playlist (even if the content transferred from the server (streamer) to the client arrives at the client before the user wants to enjoy it, the user may not be able to immediately enjoy the content since usually at least a part of the content has to be buffered and processed before; this delay can be avoided if the content arrives at the client earlier due to not separately transferring each content item, but concatenating all content items in order to obtain an "overall content item" which can be transferred in one single step).

Essential processes to provide a personal radio station are:
building the radio station,
personalizing the radio station,
updating the client cache,
adding some songs to the server buffer.

The following steps may server to build a personal radio station:

Step 1: A playlist for a channel is created by the recommender. The playlist is stored in the buffer (=channel buffer) on the manager. The device receives an identifier of the playlist (=playlist Id). At least, the playlist identified by the playlist Id contains a song Id and a position Index.

Step 2: A portion of the playlist is transferred to the device. The device requests a certain number of songs from the manager. The manager retrieves the number of songs from the buffer. The streamer summarizes the songs in a playlist accessible via a URL. The device stores the partial playlist in the cache. At least, the partial playlist identified by the playlist Id contains a song Id, a playlist URL and a song index in the playlist.

Step 3: The access to the playlist is controlled. The playlist is dedicated to the device. The manager authenticates the request. If this is done successful, the manager creates an SDP (Session Description Protocol File). The device receives the SDP file enabling access to the content stream associated with the playlist. (SDP is an internet standard (RCF 2327) that initiates sessions for multimedia network applications).

Step 4: The playlist (=table of content) was available in step 2 on the device already. The device requests the stream (=concatenated songs) associated with the playlist form the Streamer. The user can listen to the stream.

All different aspects of the present invention as set out above and further elucidated below might be combined in any way. The accompanying drawings, which are incorporated in and constitute a part of the specification, illustrate an exemplary embodiment of the invention, and, together with a general description of the invention given above, and the detailed description of the embodiments given below, serve to explain the principles of the invention, wherein:

BEST MODE FOR CARRYING OUT THE INVENTION

Figure 1:
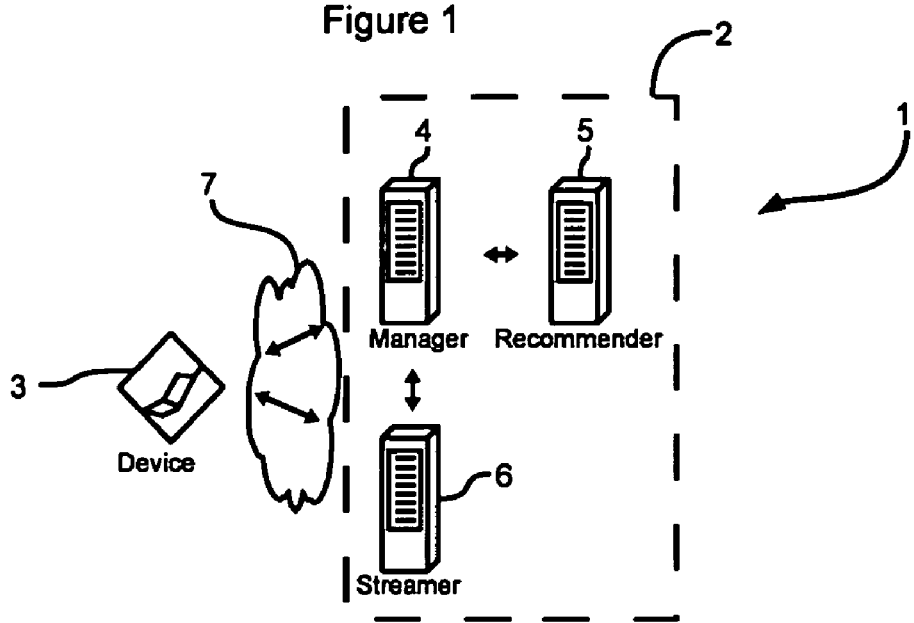
FIG. 1 shows a first embodiment of the client-server system according to the present invention.

FIG. 1 shows a preferred embodiment of the client-server system according to the present invention. A client-server system 1 comprises a server 2 and a client 3, wherein the client 3 and the server 2 are connectable with each other via a communication network 7. The server 2 comprises a managing unit 4, a recommending unit 5 and a streaming unit 6. The managing unit 4 is connectable with the recommending unit 5 as well as the streaming 6. The client 3 can directly communicate with the managing unit 4 as well as the streaming unit 6.

The managing unit 4, the recommending unit 5 as well as the streaming unit 6 may be different software modules residing on the same physical server (one single physical location), or may be realized as individual hardware components ("servers") spatially separated from each other and being linked with each other via respective communication networks (which means that the managing unit 4, the recommending unit 5 as well as the streaming unit 6 may even be located within different countries, respectively).

Figure 2:
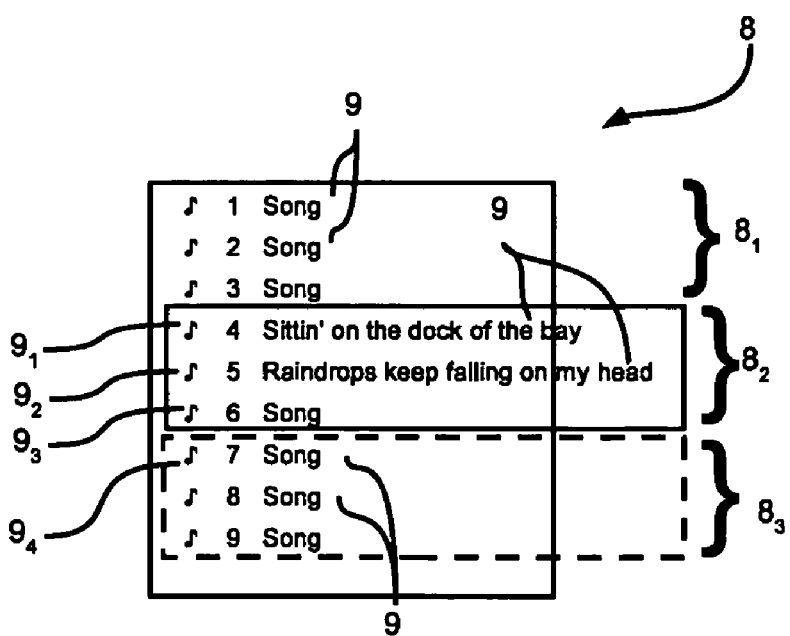
FIG. 2 shows an example of content recommendation list information which may be used by the method/client-server system according to the present invention.

Referring to FIGS. 1 and 2, according to the present invention, content items located on the server 2 are provided to the client 3 by:

a) transferring a first content recommendation list request from the client 3 to the server 2;

b) generating a first content recommendation list $8_1$ being part of an overall content recommendation list 8 stored at the server's (2) side comprising several content recommendation list entries 9 at the server 2, each content recommendation list entry 9 representing a content item, c) transferring a part of the content recommendation list generated at the server 2 as a first content recommendation list $8_1$ from the server 2 to the client 3, d) processing the first content recommendation list $8_1$ at the client 3 and generating user feedback relating to the content recommendation list entries 9 of the first content recommendation list $8_1$, e) transferring the user feedback from the client 3 to the server 2, f) generating a second content recommendation list $8_2$ being part of the overall content recommendation list 8 stored at the server's (2) side at the server 2 in dependence on the user feedback comprising content items 9 that replace content items in the first recommendation list $8_1$ that have not been sent to the client in c), g) transferring a second content recommendation list request from the client 3 to the server 2, h) transferring the second content recommendation list $8_2$ from the server 2 to the client 3, wherein the client 3 initiates streaming based transferring processes of content items from the server 2 to the client 3 in dependence on the user feedback, and wherein at least one of steps e) and f) is carried out before step g).

FIG. 2 shows an example of a concatenation 8 of several content recommendation lists $8_1$ to $8_3$ which is stored within the server 2. In this example, each of the content recommendation lists comprises three content recommendation list entries 9. The concatenation 8 of content recommendation lists $8_1$ to $8_3$ can be interpreted as user profile (the user profile may of course also contain additional data apart from the recommendation list entries 9).

In an embodiment of the present invention, step d) comprises a process of visually presenting content recommendation list entries 9 for rating and/or selection to a user of the client 3. Preferably, only the content recommendation entries 9 of one content recommendation list (the last recommendation list received) are presented to the user at one time. In the light of FIG. 2 this would mean that only the content recommendation list entries $9_1$ to $9_3$ of the content recommendation list $8_2$ is presented to the user at one time (assuming that the content recommendation list $8_2$ is the last content recommendation list received). Each of the content recommendation list entries 9 may for example be visualized as a selectable menu item (for example on a screen of the client 3) which may be selected for example using a mouse, a pen or using touch screen functionality. The content recommendation list entries 9 may also be presented to the user using acoustic devices such as loudspeakers.

According to an embodiment of the present invention, step d) comprises a process of assigning feedback information to each (or at least a part thereof) recommendation list entry 9 offered for rating and/or selection in dependence on feedback given by the user to the respective recommendation list entries 9. The feedback assigned to the recommendation list entries 9 may comprise explicit feedback (conscious behavior) and/or implicit feedback (unconscious behavior). For example, the content recommendation list entries $9_1$ to $9_3$ may be simultaneously offered to the user of the client 3 for rating and/or selection by visualizing them on a screen of the client 3. The user has then the possibility to select some of the content recommendation list entries $9_1$ to $9_3$ which means that a streaming process will be initiated. For example, if the user selects the content recommendation list entry $9_1$, a content item which is represented by the content recommendation list entry $9_1$ (the song "sitting on the dock of the bay") will be transferred from the server 2 to the client 3 on the basis of a streaming process (i.e. the user will be able to listen to this song). The selection of the content recommendation list entry $9_1$ can be interpreted as explicit feedback indicting that the user likes this song. In addition, it may also be possible for the user to rate each content recommendation list entry $9_1$ to $9_3$, i.e. to indicate whether he likes/dislikes the corresponding song, without being obliged to transfer the respective content item from the server 2 to the client 3. The rating process can be interpreted as explicit feedback. The feedback given by the user may also include implicit feedback. Examples of implicit feedback are: the user does neither select nor rate one of the content recommendation list entries $9_1$ to $9_3$; the user listens one or several of the songs corresponding to the content recommendation list entries $9_1$ to $9_3$ partially, and the ratio of playtime versus length of song is regarded as implicit feedback; the user listens to one or several songs repeatedly; thus the playcount can be interpreted as implicit feedback; the user stores references to the songs corresponding to the content recommendation list entries $9_1$ to $9_3$ as a playlist on the device 3 and the storing of the songs is interpreted as if they were rated; a user may send a reference to said songs to a friend as a personal recommendation—the system would regard the action of sending the song to a friend as an implicit rating. Some client devices may include pressure sensitive controls and implicit feedback may be provided as a function of the force applied by a user to a control button. Generally, implicit feedback may mean that the user is unaware that he/she is consciously making a decision to give feedback, and as such implicit feedback may be output from a biometric sensor, e.g. measuring a change in user's heart rate.

As already mentioned, the feedback (explicit feedback and the implicit feedback) are transferred from the client 3 to the server 2. According to an embodiment of the present invention, each individual explicit and/or implicit feedback given by the user to a specific content recommendation list entry 9 is immediately transferred from the client 3 to the server 2. The advantage of this embodiment is that each individual feedback immediately affects the generation of the next content recommendation list $8_3$ to be transferred from the server 2 to the client 3.

Assuming that only the content recommendation list entries $9_1$ to $9_3$ are displayed on the client 3, the next content recommendation list request is sent from the client 3 to the server 2 if: the user has selected and/or rated all of the content recommendation list entries $9_1$ to $9_3$; the user has not selected/rated any or only some of the content recommendation list entries $9_1$ to $9_3$ but gives a special request command. The special request command can also be generated automatically by the client. Example: the user has scrolled down through the content recommendation list entries $9_1$ to $9_3$ and tries to scroll down to the next content recommendation list entry $9_4$ (which the user believes to be already existing on the client and therefore expects to be available when scrolling down; the next content recommendation list entry does not yet exist on the client since it still needs to be transferred together with the next content recommendation list $8_3$ from the server 2 to the client 3; however, since the transferring process of the next content recommendation list $8_3$ can be performed rapidly, the user gets the impression that the next content recommendation list entry $9_4$ already existed on the client).

According to an embodiment of the present invention, the server 2 stores first recommendation list information relating to recommendation lists $8_1$, $8_2$ already transferred from the server 2 to the client 3 and second recommendation list information relating to recommendation list $8_3$ to be transferred from the server 2 to the client 3. In this example, the recommendation list $8_1$ has already been transferred to the client 3 before and selected/rated/ignored by the user. Further, the content recommendation list $8_2$ has been transferred from the server 2 to the client 3. The content recommendation list $8_2$ is currently processed, i.e. presented to the user. The content recommendation list $8_3$ has not been transferred from the server 2 to the client 3 so far, but is updated in dependence on the user feedback each time feedback is transferred from the client 3 to the server 2. That is, each time feedback is transferred from the client 3 to the server 2, the second recommendation list information is updated in dependence on the feedback. The generation of the second recommendation list information relating to the content recommendation list $8_3$ to be transferred from the server to the client 3 is based upon the user feedback transferred from the client 3 to the server 2 and the first recommendation list information relating to the recommendation lists $8_1$, $8_2$ already transferred from the server 2 to the client 3.

According to an embodiment of the present invention, the second recommendation list information relating to the content recommendation list $8_3$ to be transferred from the server 2 to the client 3 is only transferred to the client 3 upon reception of a recommendation list request from the client 3. However, it is also possible that the second recommendation list information is already transferred to the client 3 before a recommendation list request is received by the server 2.

According to an embodiment of the present invention, each recommendation list request and each recommendation list $8_1$ to $8_3$ is assigned to a specific content item data channel such that user feedback given to content recommendation list entries 9 of a specific data channel only affect the second recommendation list information of said specific data channel, and does not affect second recommendation list information of a further data channel. In this way, it is possible that each client 3 builds up several content item data channels, which are completely independent from each other. If for example the content items to be transferred from the server 2 to the client 3 are music content items, it is possible for the user of the client 3 to build several independent radio-style channels, for example a jazz radio channel, a classic radio channel and a rock/pop radio channel. The recommendations for the respective data channels generated at the server side are completely independent from each other, i.e. song rating of the rock/pop channel does not affect the song rating relating to the other data channels, for example.

According to an embodiment of the present invention, the managing unit 4, the recommending unit 5 and the streaming unit 6 interact with each other such that:
  between the managing unit 4 and the client 3, the recommendation list requests, the content recommendation lists $8_1$-$8_3$ and the user feedback are exchanged,
  between the managing unit 4 and the recommending unit 5, recommendation list correlated information and user feedback correlated information is exchanged,
  between the managing unit 4 and the streaming unit 6, content item correlated information is exchanged,
  between the streaming unit 6 and the client 3, content items and content item correlated information are exchanged,
  the first recommendation list information relating to content recommendation lists $8_1$, $8_2$ already transferred from the server 2 to the client 3, and the second recommendation list information relating to content recommendation lists $8_3$ to be transferred from the server 2 to the client 3 is stored/maintained in/by the managing unit 4.

In this first embodiment (corresponding to FIGS. 3 to 6), all content recommendation lists $8_1$-$8_3$ are stored/maintained in/by the managing unit.

Alternatively, the managing unit 4, the recommending unit 5 an the streaming unit 6 may interact with each other such that:
  between the managing unit 4 and the client 3, the user feedback is exchanged,
  between the managing unit 4 and the recommending unit 5, recommendation list correlated information and user feedback correlated information is exchanged,
  between the managing unit 4 and the streaming unit 6, recommendation list correlated information is exchanged,
  between the streaming unit 6 and the client 3, content items, content item correlated information, the recommendation list requests, and the recommendation lists are exchanged,
  the first recommendation list information relating to content recommendation lists $8_1$, $8_2$ already transferred from the server 2 to the client 3 is stored/maintained in/by the managing unit 4, and the second recommendation list information relating to content recommendation lists $8_3$ to be transferred from the server 2 to the client 3 is stored/maintained in/by the streaming unit 6.

In this second embodiment (corresponding to FIG. 7) all recommendation lists $8_1$,$8_2$,$8_3$ are assigned to on single play list URL (Uniform Resource Locator) and can therefore be accessed using the same play list URL. In contrast, in the first embodiment, each recommendation list $8_1$,$8_2$,$8_3$ is assigned to a different URL. From the user's perspective, the second embodiment does not show any advantages; from a system design perspective, the number of requests among system components and the amount of information transferred can be reduced in the second embodiment.

As already mentioned, it is advantageous that each content recommendation list $8_1$ to $8_3$ does not contain too much content recommendation list entries 9. The reason is, that in case there are too much content recommendation list entries 9, the adaptation of the recommended content to the user's taste slows down (the "personalization" of the recommended content items converges at a lower speed). In addition, the amount of data transferred between device 3 and server 2 can partitioned in small pieces that enable rapid data transfer even on low bandwidth networks such as GSM mobile phone networks.

In the following description, it is assumed that the client-server system relates to a system for providing music content items from the server 2 to the client 3.

Figure 3:
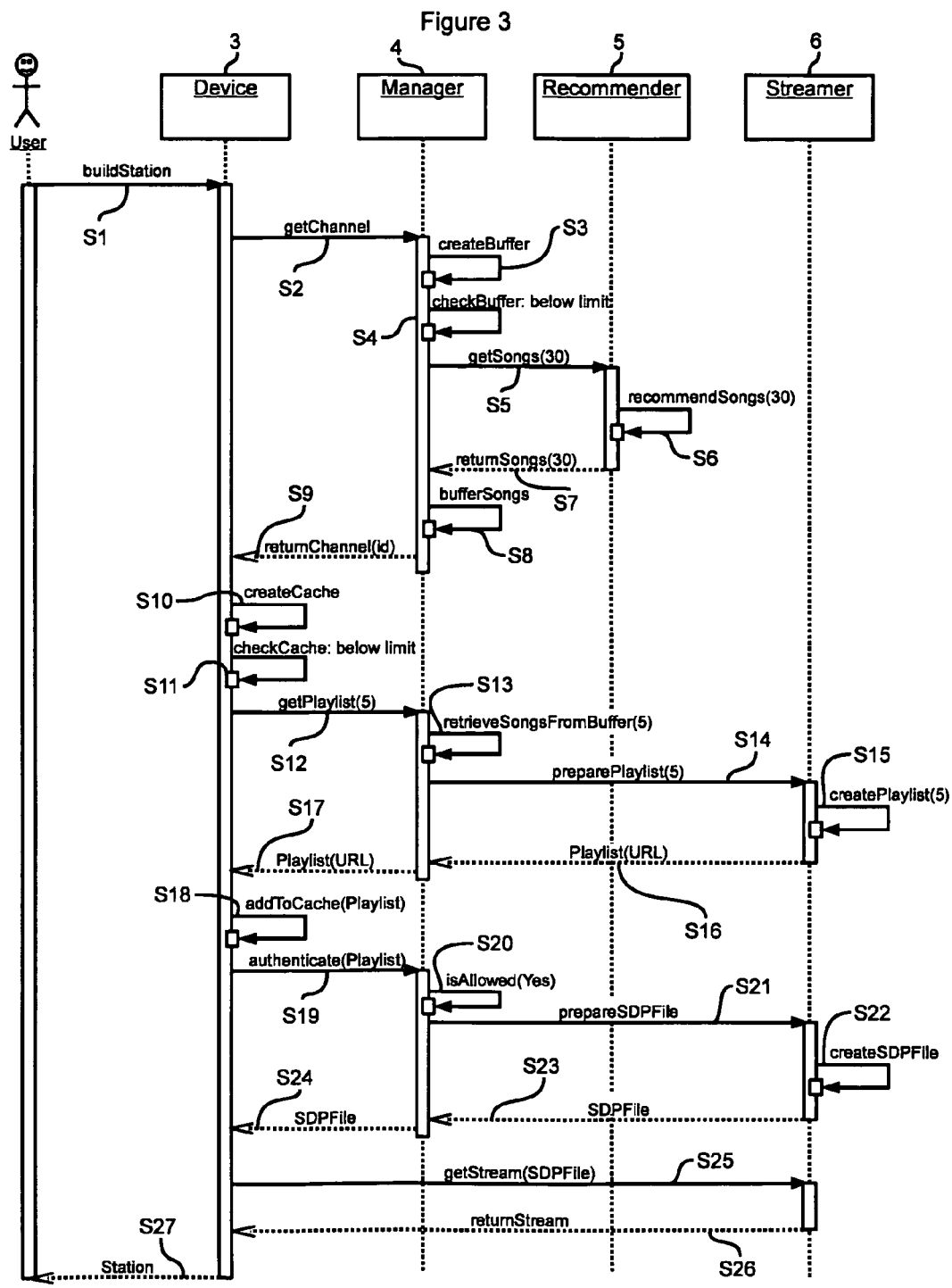
FIG. 3 shows a first stage of a first embodiment of the method according to the present invention.

FIG. 3 shows the case where a new content item data channel which has not been used so far is built.

In step S1, the user decides to build a new content item data channel and instructs the client 3 to build up a respective channel. In step S2, the client 3 sends a channel-build request to the managing unit 4. In step S3, the managing unit 4 creates a buffer (allocates storing space) within its memory or a storing unit such as a database attached. In step S4 the managing unit checks whether any recommendation list information is stored within the buffer. Since, however, the content item data channel to be set up has not been used so far, no recommendation list information is stored within the buffer created in step S3. Therefore, the managing unit 4 requests in step S5 new recommendation list information from the recommending unit 5. The recommending unit 5 generates the requested recommendation list information in step S6 and sends this information in step S7 to the managing unit 4. The managing unit 4 buffers the received recommendation list information within its buffer in step S8. The managing unit 4 informs the client 3 in step S9 that recommendation list information is available at the managing unit, i.e. that a respective content item data channel has been built. The content item data channel is identified by an ID sent from the managing unit 4 to the client 3 in step S9. In step S10 the client creates a cache (allocates storing space) for storing recommendation lists to be received by the managing unit 4. Since the client 3 realizes in step S11 that no recommendation list entries are available within the cache generated in the previous step, it sends a content recommendation list request to the managing unit in step S12. In this case, a recommendation list comprising five content recommendation list entries 9 is requested. In step S13, the managing unit extracts five content recommendation list entries from the buffer and instructs in step S14 the streaming unit 6 to "prepare" corresponding content items to be accessed for streaming which is done by the streaming unit 6 in step S15. In step S16, the streaming unit 6 sends content item access data (in this case an URL) to the managing unit 4. This data is forwarded by the managing unit 4 to the client 3 in step S17. Further, in step S17, the content recommendation list stored within the buffer of the managing unit 4 is transferred from the managing unit 4 to the client 3. In step S18, the content recommendation list is inserted into the cache created during step S10. In step S19, an authentication request for accessing the content recommendation list ("play list") received during step S17 is sent to the managing unit 4. In step S20, the managing unit proves whether the client 3 is allowed to access the content items requested. If the managing unit proves that the client 3 is allowed to access, a request for preparing security data (a SDP file) is sent from the managing unit 4 to the streaming unit 6 in step S21. The streaming unit 6 creates the requested SDP file during step S22 and forwards it in step S23 to the managing unit 4 which itself forwards it to the client 3 in step S24. In step S25, the client 3 requests the desired content items corresponding to the content recommendation list received in step S17 from the streaming unit to the client 3 which is done in step S26. In step S27, the station building process has been completed. The user of the client 3 can enjoy the stream of music data received from the streaming unit. Steps S19 to S24 are only needed when the client 3 "registers" itself for the first time at the managing unit 4 ("handshaking process"). These steps serve to secure that no unauthorized client accesses content items.

Figure 4:
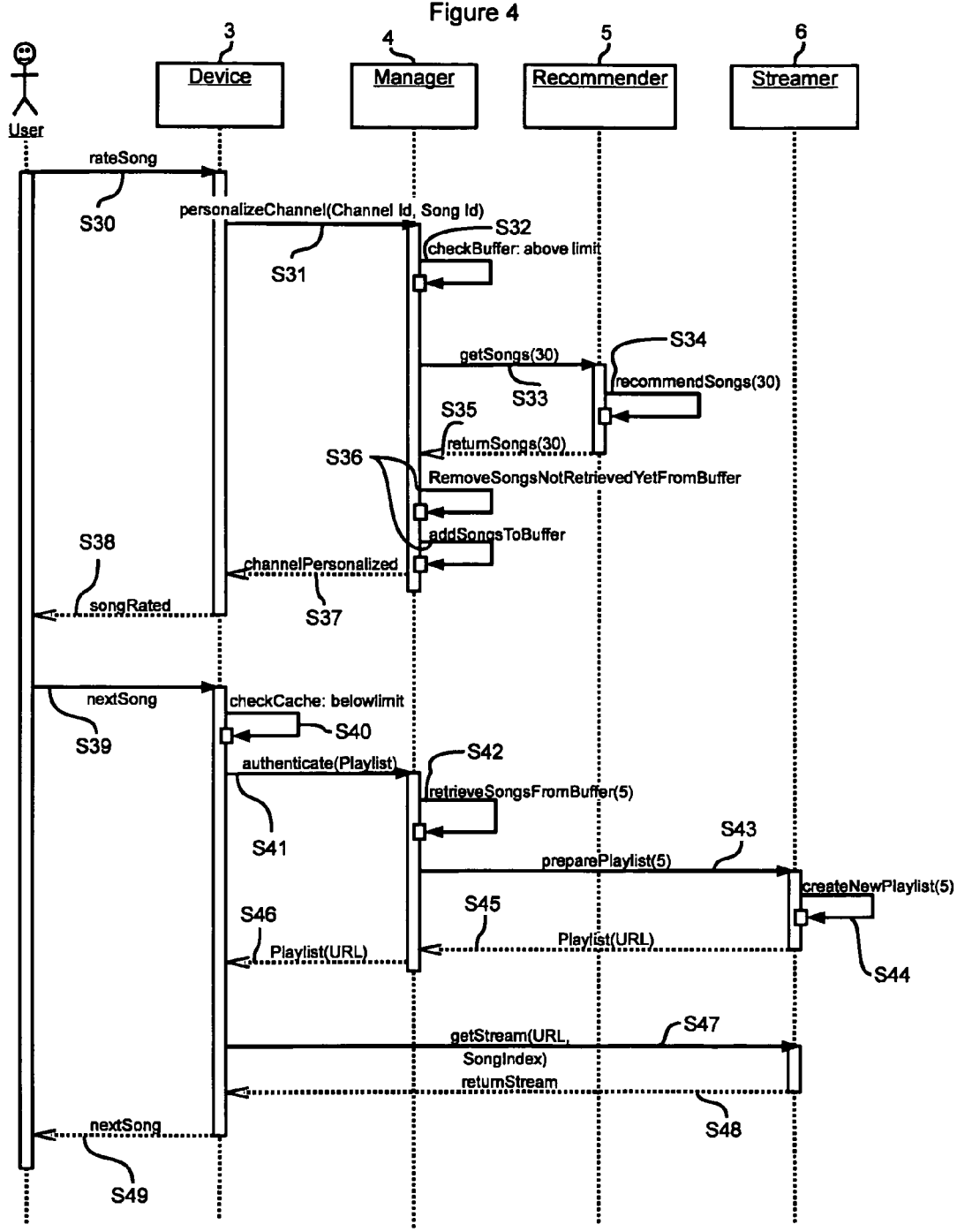
FIG. 4 shows a second stage of the first embodiment of the method according to the present invention.

FIG. 4 shows a second stage of the first embodiment of the present invention.

In step S30, the user gives feedback whether he likes/dislikes a specific content recommendation list entry 9. This feedback is supplied in step S31 to the managing unit 4. In order to clearly assign this feedback to a specific content recommendation list entry 9, the corresponding content item data channel ID as well as well as the ID of the content recommendation list entry is delivered together with the feedback to the managing unit 4. In step S32, the managing unit 4 checks whether the number of content recommendation list entries 9 stored for the content item data channel in the buffer of the managing unit 4 is below or above a threshold. Even though the number of content recommendation list entries 9 in the buffer are above the threshold here, the managing unit nevertheless initiates to update the content recommendation list 8 in the buffer when feedback (rating information) is received. The content items are updated in order to adapt the content items for recommendation to the users preferences based on the ratings. In step S33, a request for further content recommendation information is sent from the managing unit 4 to the recommending unit 5. In this step, also the feedback received by the managing unit 4 during step S31 is sent from the managing unit 4 to the recommending unit 5. In step S34, the feedback received by the recommending unit 5 is processed in order to generate new recommendation list information. This information is sent in step S36 from the recommending unit 5 to the managing unit 4. In step S36, the recommendation list information relating to content recommendation lists to be transferred from the server 2 to the client 3 is updated, i.e. replaced by the recommendation list information sent from the recommendation unit 5 to the managing unit 4 in step S35. In step S36 information is sent from the managing unit 4 to the client 3 indicating that the second recommendation list information relating to content recommendation lists to be transferred from the server 2 to the client 3 is updated, i.e. replaced by the recommendation list information sent form the recommending unit 5 to the managing unit 4 in step S35. In step S37 information is sent from the managing unit 4 to the client 3 indicating that the second recommendation list information relating to content recommendation lists to be transferred from the server 2 to the client 3 has been updated at the server side. In step S38 this is indicated to the user.

Steps S30 to S38 may be repeated for each content recommendation list entry offered to the user in a previous step.

In step S39, the user wishes to listen to a specific content item, i.e. to a specific song represented by a content recommendation list entry 9 at the client's side. In step S40 the client 3 checks whether the amount of available recommendation list entries at the client 3 which have not been transferred from the streaming unit 6 to the client 3 has fallen under a certain threshold value. If this is case, the client 3 sends a content recommendation list as request to the managing unit 4 in step S41. In step S42 corresponding recommendation list entries are retrieved from the buffer, and in step S43, the streaming unit 6 is instructed by the managing unit 4 to prepare a list of content items corresponding to the content recommendation list entries for download, which is performed in step S44. In step S45, access information (URL) corresponding to the prepared list of content items is provided to the managing unit 4, which forwards this information in step S45 together with the corresponding recommendation list entries in step S46 to the client 3. In step S47, the client 3 demands the streaming unit 6 to provide one or several content items prepared to be transferred to the client 3 by a streaming process, which is done in step S48. The user can then listen to the data stream in step S49.

Figure 5:
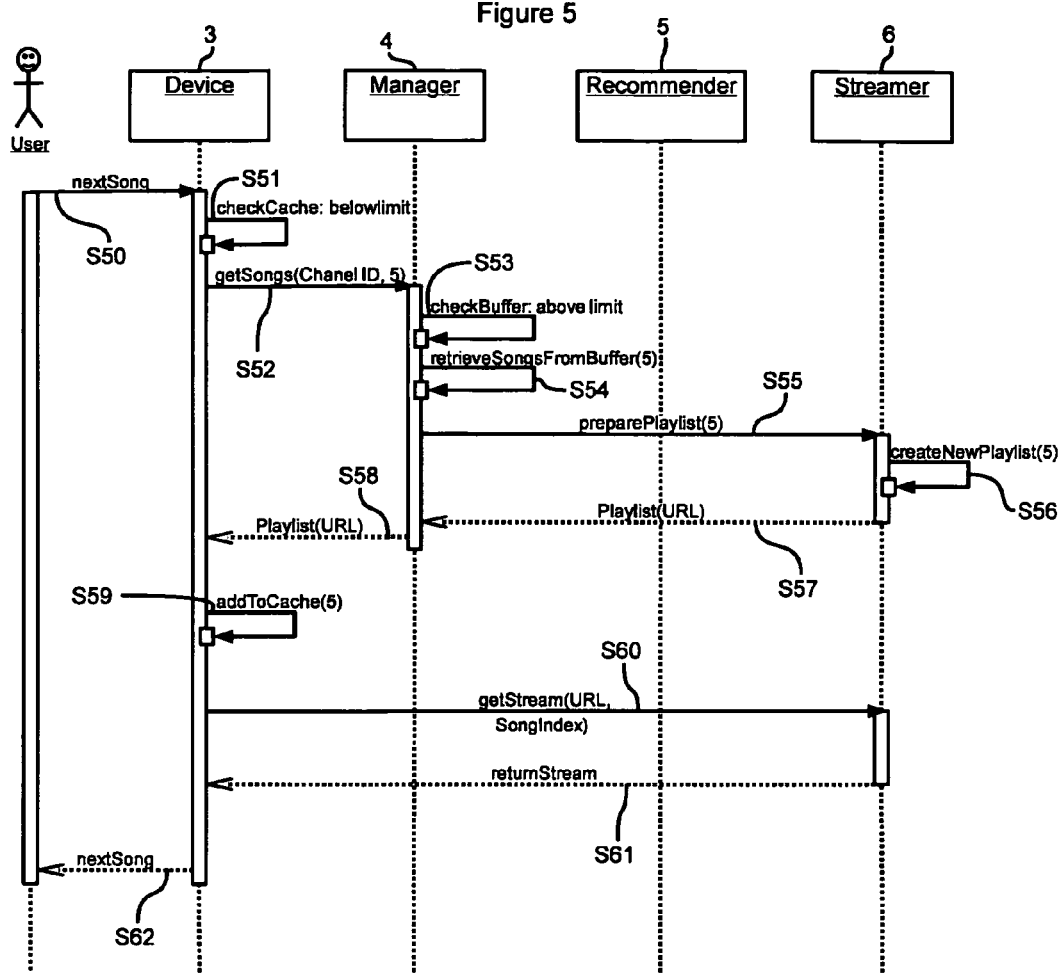
FIG. 5 shows a third stage of the first embodiment of the method according to the present invention.

FIG. 5 shows a first stage of the first embodiment of the method according to the present invention. Steps S50 to S62 correspond to steps S39 to S49 in FIG. 4, however, with additional steps S53 and S59, wherein in step S53 it is checked whether content list recommendation entries included within the recommendation list information are above a certain threshold value. In step S59, the content recommendation list entries 9 received in step S58 are added to the cache of the client 3.

Figure 6:
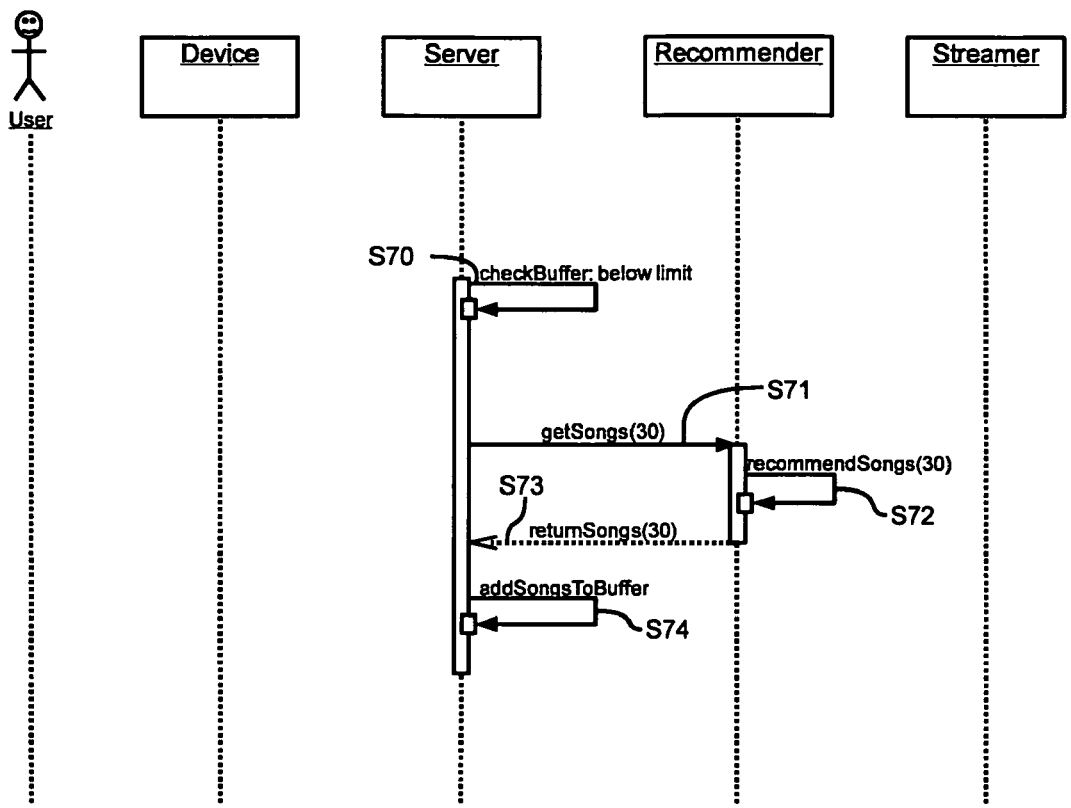
FIG. 6 shows a fourth stage of the first embodiment of the method according to the present invention.

In FIG. 6 a fourth stage of the first embodiment of the method according to the present invention is shown. The steps S70 to S74 correspond to steps S4 to S8 in FIG. 3 and are performed automatically at the server side independent from the client when the managing unit 4 detects that the content recommendation list entries 9 still available at the managing unit 4 have been fallen under a certain threshold value.

Figure 7:
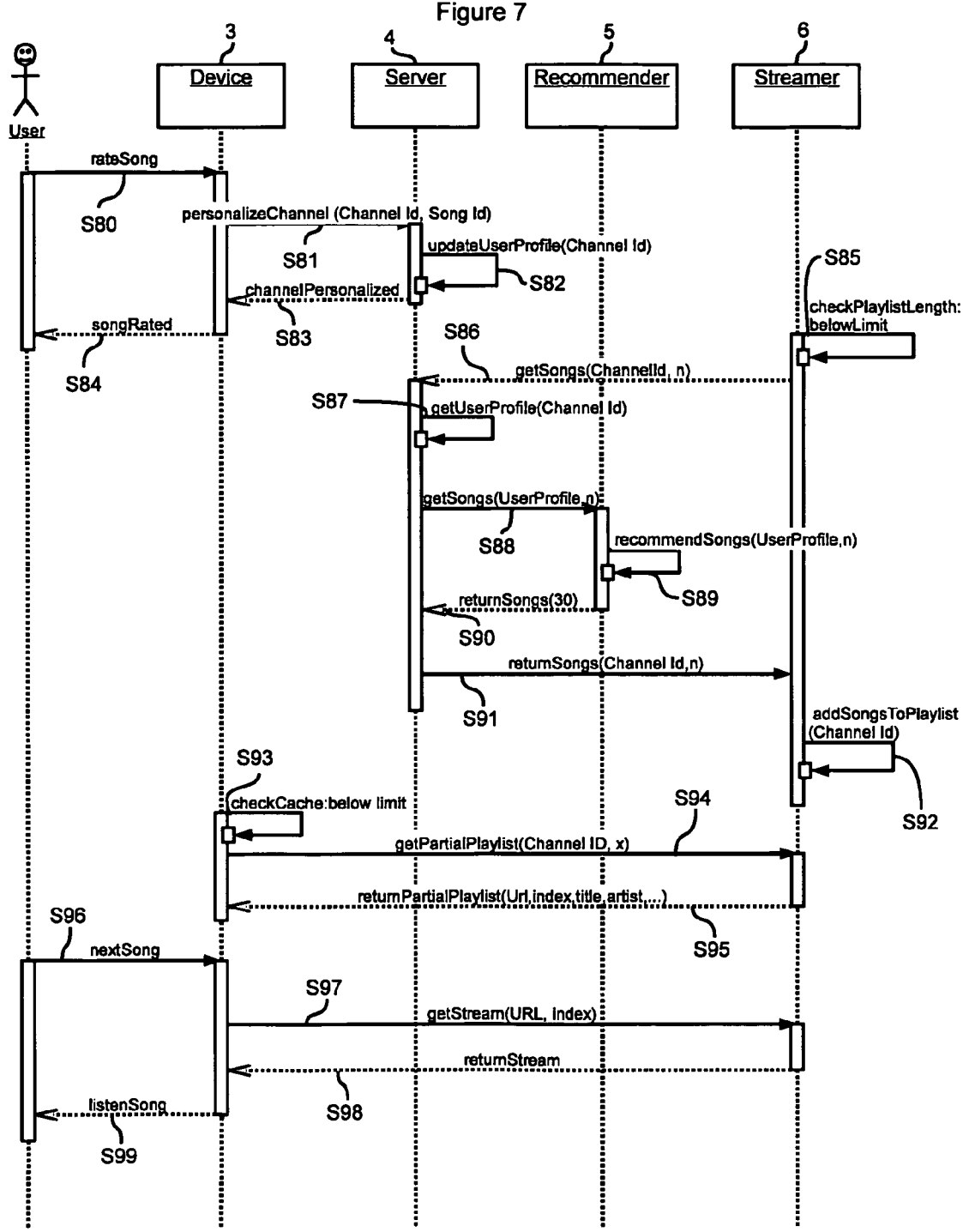
FIG. 7 shows a second embodiment of the method according to the present invention.

In FIG. 7 a second embodiment of the method according to the present invention is shown.

In step S80, the user rates a specific content recommendation list entry 9. In step S81, the corresponding feedback is provided to the managing unit 4. The managing unit 4 updates in step S82 the corresponding user profile (i.e. stores the feedback) and provides in step S83 respective confirming information to the client 3 which is indicated in step S84 to the user. Independent from this operation, in step S85 the streaming unit 6 checks whether the amount of prepared content items retrieved has fallen under a certain threshold value. If this is the case, the streaming unit 6 instructs the managing unit 4 in step S86 to provide further recommendation list information. In order to do this, the managing unit 4 retrieves the updated user profile (updated during step S82) and instructs the recommending unit 5 in step S88 to provide further recommendation list information. This is done by the recommending unit 5 in step S89 which is reported in step S9 to the managing unit. In step S91, the thus obtained recommendation list entries are provided to the streaming unit 6 during the step S91. In step S92 the streaming unit 6 adds corresponding content items to its content item list prepared for streaming. Independent from steps S85 to S92, the client 3 realizes in step S93 that the content recommendation entries remaining in its cache have been fallen under a certain threshold value. Therefore, in step S94, the client 3 instructs the streaming unit 6 to provide a further content recommendation list which is provided in step S95 from the streaming unit 6 to the client 3. If the user wishes, as indicated in step S96, to listen to a new song, the client 3 can use the information received in step S95 to demand for a further content item which is transferred from the streaming unit 6 to the client 3 in step S98. Thus, the user can listen to the song in step S99.

Figure 8:
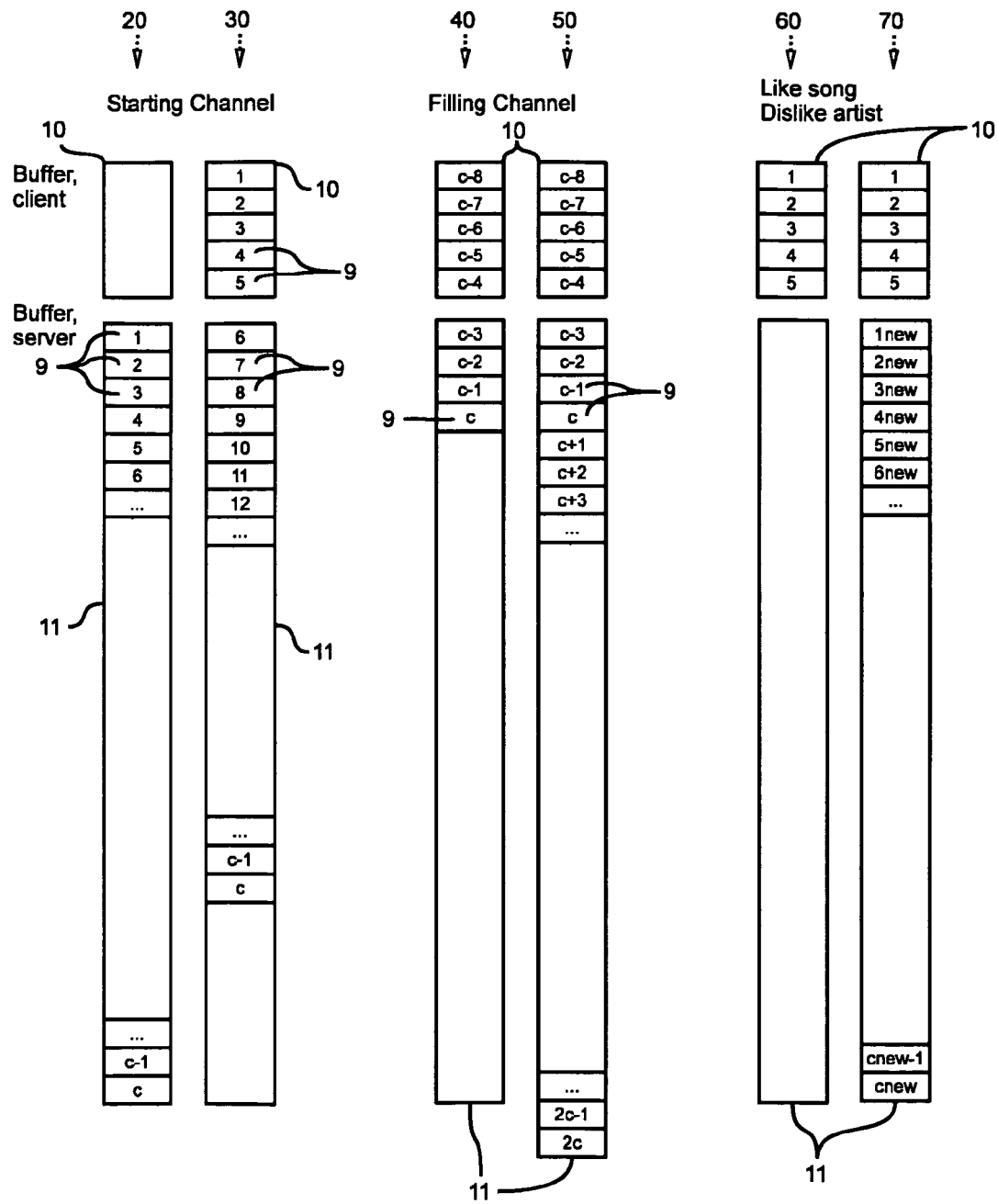
FIG. 8 shows examples of different stages of buffer states of buffers used in conjunction with the method/client-server system according to the present invention.

In FIG. 8 the working principle of the buffer system used by the method/client-server system according to the present invention will be explained. The buffer system consists of a client cache 10 and a server buffer 11.

At an initial stage 20, no content recommendation list entries 9 are available in the client buffer 10. However, content recommendation list entries 9 are available within the server buffer 11. In a second stage 30, after the client 3 has demand for content recommendation list entries (content recommendation list request), some of the content recommendation list entries 9 (reference with 1 to 5) are transferred from the server buffer 11 to the client buffer 10 and are at the same time deleted from the server buffer 11. Alternatively to deletion, they may remain in the server buffer marked however that they have already been transferred to the client cache so that the elements are not contained in a second recommendation list. The user of the client 3 can select the content recommendation items 9 in order to initiate the streaming process of corresponding content items from the server 2 to the client 3. Further, the user can rate the content recommendation list entries 9. When doing so, the content recommendation list entries are deleted from the client buffer 10. Therefore, the client 3 asks for more content recommendation list entries (new content recommendation request). This process is repeated until stage 40 is reached. In this stage, the server realizes that the remaining content recommendation list entries 9 (referenced with c to c−3) has been fallen under a certain threshold value (in this case the threshold value is 5). Therefore, the server starts a refill process, the result of which is shown in stage 50: New content recommendation list entries (reference with c+1 to 2c) have been added to the server buffer 11. This is done although the client 3 has not demanded for new content recommendation list entries 9 so far.

If a user rates a content item 9 available in the client cache 10 on the client 3 while the server buffer 11 is populated with more content recommendation list entries 9 than the threshold (e.g. stage 30 and 50), the recommendation list 8 is updated in order to be adapted to the users preferences. Stage 60 represents the state of the server buffer after $S36_1$ (RemovesSongsNotRetrieved) in FIG. 4. Stage 70 represents the state of the server buffer after $S36_2$ (addSongsToBuffer).

Figure 9:
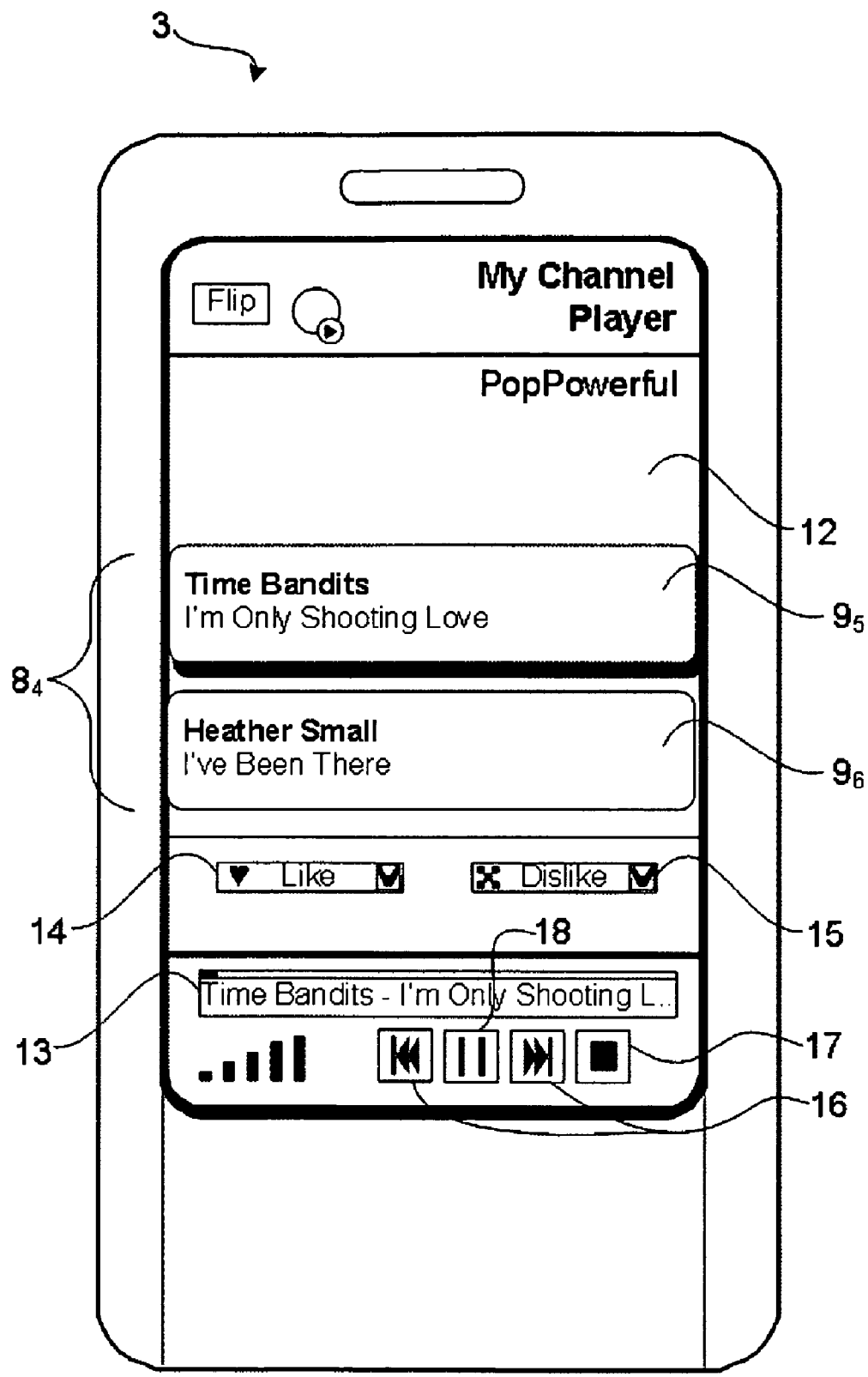
FIG. 9 a first stage of the user interface of a client usable in conjunction with the present invention.

In FIG. 9, a first stage of a user interface 12 of a client 3 usable in conjunction with the present invention is shown. In this embodiment, the user interface 12 is a touch screen. The touch screen comprises a "like" button 14 and a "dislike" button 15. Further, the touch screen comprises two skip buttons 16, one stop button 17 and one pause button 18. The touch screen displays a first content recommendation list $8_4$ comprising two content recommendation list entries $9_5$, $9_6$, each content recommendation list entry representing one content item (song) which can be selected for consuming. The "like" button 14 and a "dislike" button 15 may also be extended by "like/dislike artist" buttons, "like/dislike mood" buttons, "like/dislike decade" buttons, etc. (general: content item attribute like/dislike buttons), in order to enable a detailed rating of the content recommendation list entries presented for rating.

In the stage shown in FIG. 9, the user currently listens to the song represented by the content recommendation list entry $9_5$ (highlighted), which is indicated by an information bar 13 showing the band and the title of the song currently played.

Figure 10:
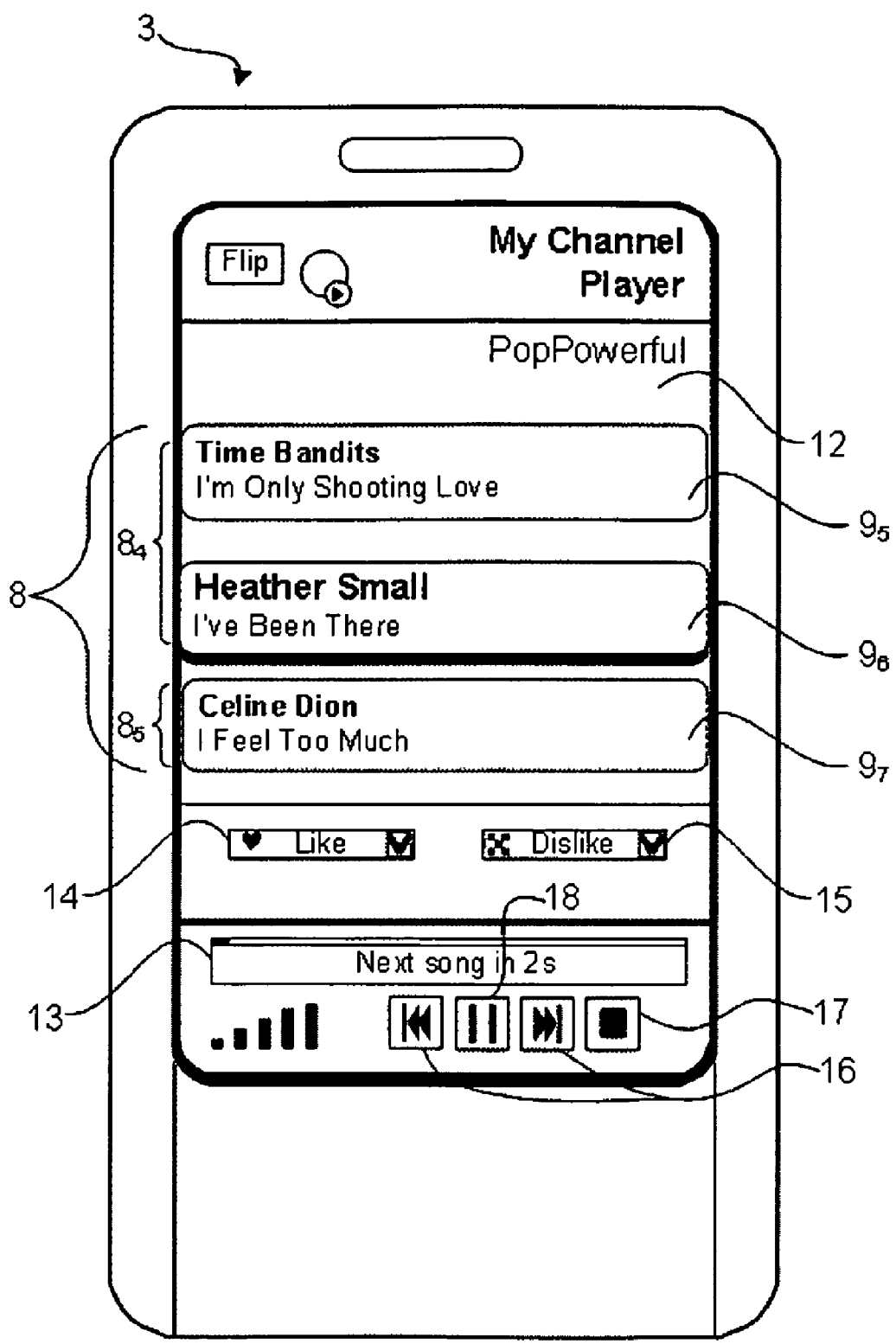
FIG. 10 a second stage of the user interface of a client usable in conjunction with the present invention.

If the user presses the right skip button 16 (after having listened or during listening to the song represented by content recommendation list entry $9_5$), he arrives at the stage shown in FIG. 10.

In this stage, the second content recommendation list entry $9_6$ of the first content recommendation list $8_4$ is highlighted, and the user can decide whether he wants to enjoy to listen to the song corresponding to content recommendation list entry $9_6$ (for example by touching the highlighted part, i.e. the content recommendation list entry $9_6$ with his finger or with a pen) or whether he just wants to rate the content recommendation list entry $9_6$ (by pressing the "like" button 14 or the "dislike" button 15). Here, the user has decided to listen to the song. However, although the user instructed the client 3 to play the song, the song is not immediately available since it has still to be transferred from the server 2 to the client 3. This is indicated by the information bar 13 indicating the estimated delay.

At the same time when the content recommendation list entry $9_6$ is highlighted, a further content recommendation list entry $9_7$ appears "from below" (the user scrolls through the content recommendation list entries downwards) which is the first content recommendation list entry of a second content recommendation list $8_5$ received by the client 3 from the server 2. The first and second content recommendation list $8_4$, $8_5$ can be interpreted as parts of an overall content recommendation list 8 stored and maintained at the server 2. The second content recommendation $8_5$ has been generated at the server 2 in response to feedback given by the user on the content recommendation list entry $9_5$ (and perhaps feedback on previously displayed content recommendation list entries) of the first content recommendation list $8_4$. Here, the feedback has not been given by using the like/dislike buttons 14, 15, but results from the fact that the user has listened to the song represented by content recommendation list entry $9_5$ (which means that the user is at least interested in that song).

Since the content recommendation list entry $9_7$ has been prepared at the server in advance based on feedback given by the user in conjunction with previously offered content recommendation list entries (in particular content recommendation list entry $9_5$), it is possible to provide content recommendation list entry $9_7$ very quickly when passing from the stage shown in FIG. 9 to the stage shown in FIG. 10.

Figure 11:
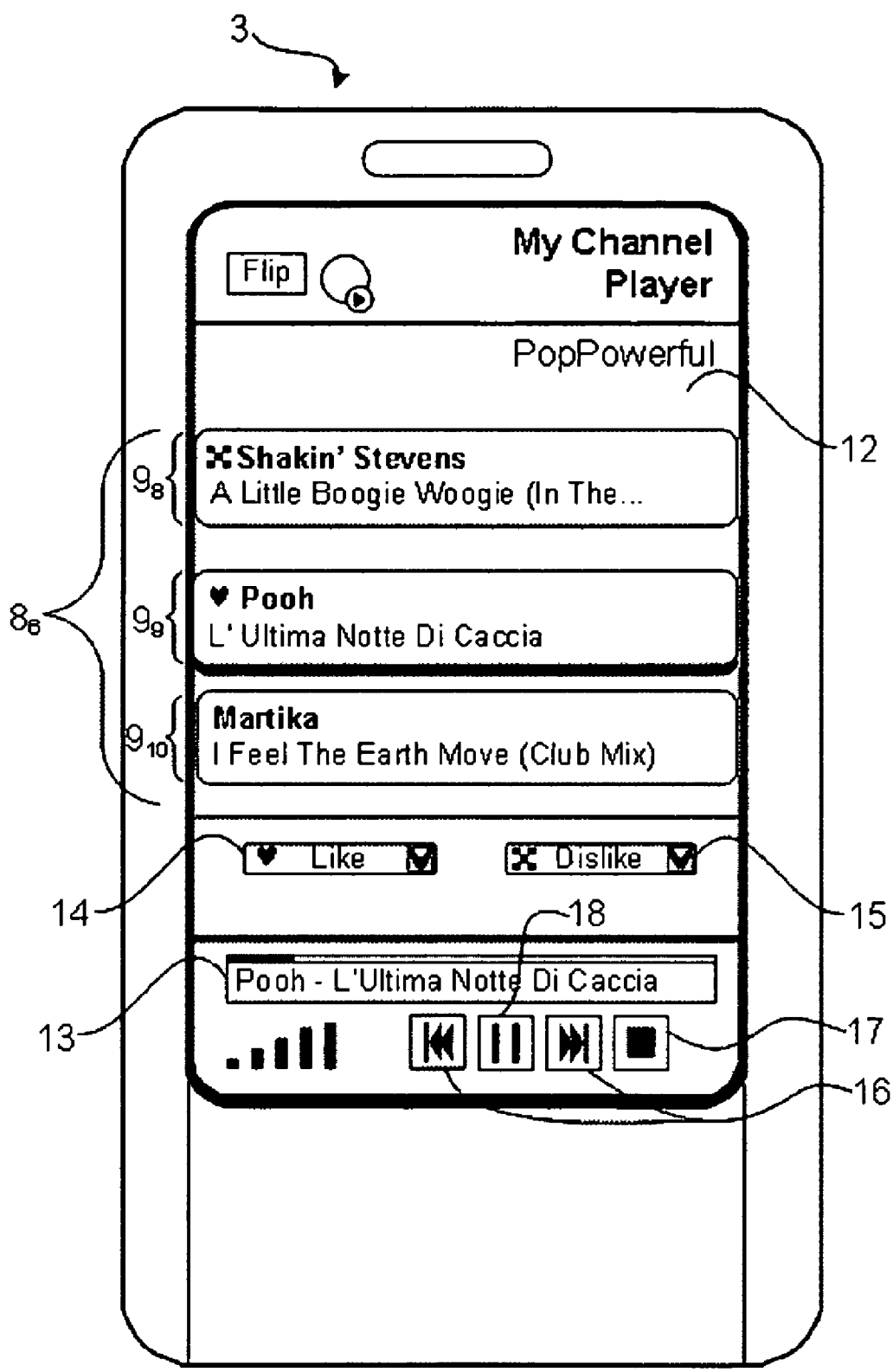
FIG. 11 a third stage of the user interface of a client usable in conjunction with the present invention.

FIG. 11 shows the case where three content recommendation list entries $9_8$ to $9_{10}$ of a third content recommendation list $8_6$ are displayed. As can be derived from FIG. 11, the user has in a first step highlighted content recommendation list entry 9₈ and then pressed the dislike button 15, then pressed the right skip button 16 in order to highlight the content recommendation list entry 9₉ and then pressed the like button 14. In response to these actions, like/dislike symbols are assigned to the respective content recommendation list entries, which is indicated by respective symbols within the content recommendation list entries 9₈ and 9₉ on the display. The feedback on the content recommendation list entries 9₈ and 9₉ is (preferably immediately) sent to the server 2 in order to prepare further content recommendation list entries to be transferred to the client 3 in advance (in dependence on the feedback).

| Reference Symbols | |
|---|---|
| 1 | server-system |
| 2 | server |
| 3 | client |
| 4 | managing unit |
| 5 | recommending unit |
| 6 | streaming unit |
| 7 | communication network |
| 8 | content recommendation list |
| 9 | content recommendation list entry |
| 10 | client buffer |
| 11 | server buffer |
| 20, 30, 40, 50, 60 und 70 | buffer stages |
| 12 | user interface |
| 13 | information bar |
| 14 | like button |
| 15 | dislike button |
| 16 | skip button |
| 17 | stop button |
| 18 | pause button |

The invention claimed is:

1. A method for providing content items located on a server to a client on a mobile device, the server being able to communicate with the client via a communication network, comprising the following steps:

a) transferring a first content recommendation list request from the client to the server;

b) generating a first portion of a content recommendation list comprising several content recommendation list entries arranged in an ordered sequence at the server in dependence on a user feedback profile, each content recommendation list entry representing a content item;

c) transferring the first portion of the content recommendation list from the server to the client;

d) providing a visual representation of the content recommendation list entries in the first portion of the content recommendation list through a client user interface, each entry being selectable and arranged such that for each entry, user feedback may be generated and corresponding user feedback information sent to the server;

e) expanding the partially transferred content recommendation list at the server by generating a second portion of the content recommendation list comprising a plurality of additional content recommendation list entries based on the user feedback information;

f) transferring from the client to the server, upon a user attempt to scroll past a last displayed entry in the first portion of the content recommendation list, a second recommendation list request for the second portion of the content recommendation list that was generated based on the user feedback information; and g) in response to the second recommendation list request:
transferring the second portion of the content recommendation list that was generated based on the user feedback information from the server to the client on the mobile device;
automatically appending the second portion of the content recommendation list that was generated based on the user feedback information to the end of the first portion of the content recommendation list on the mobile device, wherein the client on the mobile device maintains the first portion with the second portion appended thereto such that the first portion and the appended second portion form part of an overall, selectable content recommendation list; and
providing a visual representation of the content recommendation list entries in the second portion of the content recommendation list through the client user interface,
wherein the client initiates at least one transfer process of content items from the server to the client based on user selections of recommendation list entries, and wherein the second portion of the content recommendation list is prepared at the server in advance of receiving the second recommendation list request from the client.

2. The method according to claim 1, wherein step d) comprises a process of assigning feedback information to at least some content recommendation list entries in dependence on feedback given by the user to each of the content recommendation list entries presented on the client user interface.

3. The method according to claim 2, wherein the feedback assigned to the content recommendation list entries comprises explicit and implicit feedback.

4. The method according to claim 3, wherein each individual explicit and/or implicit feedback given by the user to a specific content recommendation list entry is immediately transferred from the client to the server.

5. The method according to claim 3, wherein the explicit feedback in particular represents conscious behavior of the user, whereas the implicit feedback in particular represents unconscious behavior of the user.

6. The method according to claim 1, wherein said first content recommendation list and said second content recommendation list are parts of one overall content recommendation list which is stored on the server and maintained in dependence on the user feedback information received by the server.

7. The method according to claim 6, wherein the server stores first recommendation list information relating to content recommendation lists already transferred from the server to the client and/or second recommendation list information relating to content recommendation lists to be transferred from the server to the client, wherein the first content recommendation list information and the second content recommendation list information are part of content recommendation list information relating to the overall content recommendation list.

8. The method according to claim 7, wherein the second recommendation list information relating to content recommendation lists to be transferred from the server to the client is updated in dependence on the user feedback each time feedback is transferred from the client to the server.

9. The method according to claim 8, wherein the generation of the second recommendation list information relating to content recommendation lists to be transferred from the server to the client is based upon the user feedback transferred from the client to the server and on the first recommendation list information relating to content recommendation lists already transferred from the server to the client.

10. The method according to claim 7, wherein the second recommendation list information relating to content recommendation lists to be transferred from the server to the client is only transferred from the server to the client upon reception of a recommendation list request from the client.

11. The method according to claim 10, wherein each recommendation list request and each recommendation list is assigned to a specific content item data channel such that user feedback given to content recommendation list entries of a specific data channel only affects the second recommendation list information of said specific data channel, and does not affect second recommendation list information of a further data channel.

12. The method according to claim 1, wherein the server comprises a managing unit, a recommending unit and a streaming unit, the managing unit being connectable to the recommending unit, the streaming unit and the client, and the streaming unit being connectable to the client.

13. The method according to claim 12, wherein:
between the managing unit and the client, the recommendation list requests, the content recommendation lists and the user feedback is exchanged;
between the managing unit and the recommending unit, recommendation list correlated information and user feedback correlated information is exchanged;
between the managing unit and the streaming unit, content item correlated information is exchanged;
between the streaming unit and the client, content items and content item correlated information is exchanged; and
the first recommendation list information relating to content recommendation lists already transferred from the server to the client, and the second recommendation list information relating to content recommendation lists to be transferred from the server to the client are stored/maintained by the managing unit.

14. The method according to claim 12, wherein:
between the managing unit and the client, the user feedback is exchanged;
between the managing unit and the recommending unit, recommendation list correlated information and user feedback correlated information is exchanged;
between the managing unit and the streaming unit, recommendation list correlated information is exchanged;
between the streaming unit and the client, content items, content item correlated information, the recommendation list requests, and the recommendation lists are exchanged;
the first recommendation list information relating to content recommendation lists already transferred from the server to the client is stored/maintained by the managing unit; and
the second recommendation list information relating to content recommendation lists to be transferred from the server to the client is stored/maintained by the streaming unit.

15. The method according to claim 1, wherein each content recommendation list comprises less than ten content recommendation list entries.

16. The method according to claim 15, wherein at least two content items are transferred as concatenated common content item from the server to the client.

17. The method according to claim 16, wherein the at least one transfer process of content items from the server to the client initiated by the client based on user selections of recommendation list entries is a streaming process.

18. A client-server system adapted to provide content items located on the server to the client, the server being able to communicate with the client via a communication network, comprising:
a) a client transmission interface controlled to transfer a first content recommendation list request from the client to the server;
b) a server processor operable to generate a first portion of a content recommendation list comprising several content recommendation list entries arranged in an ordered sequence in dependence on a user feedback profile, each content recommendation list entry representing a content item;
c) a server transmission interface controlled to transfer the first portion of the content recommendation list from the server to the client;
d) a client processor operable to provide a visual representation of the content recommendation list entries in the first portion of the content recommendation list through a client user interface, each entry being selectable for a user, the client processor having the ability to generate user feedback on the selectable content recommendation list entries under the control of the user and to send corresponding feedback information to the server, wherein upon a user attempt to scroll past a last displayed entry in the first content recommendation list, a second recommendation list request is transferred to the server, the second recommendation list request requesting a second portion of the content recommendation list generated based on the user feedback information;
e) the server processor further operable to generate the second portion of the content recommendation list comprising a plurality of additional ordered content recommendation list entries based on the user feedback information; and
f) the server transmission interface further controlled to transfer the second portion of the content recommendation list that was generated based on the user feedback information from the server to the client in response to the second recommendation list request and, while maintaining the first portion with the second portion on the client as an overall, selectable content recommendation list, providing a visual representation of the content recommendation list entries in the second portion of the content recommendation list through the client user interface, wherein the client initiates at least one transfer process of content items from the server to the client based on user selections of recommendation list entries, and wherein the second portion of the content recommendation list is prepared at the server in advance of receiving the second recommendation list request from the client.

19. A method for sequentially receiving portions of a content recommendation list, the method comprising:
receiving and storing in a computer readable medium, in response to a first request, a first portion of the content recommendation list based on a user profile, the first portion of the content recommendation list comprising a first subset of content recommendation entries arranged in an ordered sequence;
displaying the entries in the first subset on a display device;
transmitting user feedback information related to the first subset;
transmitting a second request upon detecting a user attempt to scroll past a last displayed entry in the first subset, the second request requesting a second portion of the content recommendation list generated based on the user feedback information; and in response to the second request, while maintaining the first portion of the content recommendation list, receiving and storing the second portion of the content recommendation list based at least in part on the user feedback information, the second portion of the content recommendation list comprising a second subset of content recommendation entries arranged so as to continue the ordered sequence, the first subset and the second subset each comprising a plurality of the content recommendation entries.

20. A method for sequentially providing portions of a content recommendation list to a playback device, the method comprising:

generating and storing in a computer readable medium a first portion of the content recommendation list based on a user profile, the first portion of the content recommendation list comprising a first subset of content recommendation entries arranged in an ordered sequence;

transferring the first portion of the content recommendation list to the playback device in response to a first request;

receiving user feedback information related to the first subset from the playback device;

receiving a second request from the playback device, the second request indicating a user attempt to scroll past a last displayed entry in the first subset, the second request requesting a second portion of the content recommendation list generated based on the user feedback information; and upon receiving the second request from the playback device, while maintaining the first portion of the content recommendation list on the playback device, transferring to the playback device the second portion of the content recommendation list based at least in part on the user feedback information, the second portion of the content recommendation list comprising a second subset of content recommendation entries arranged so as to continue the ordered sequence, the first subset and the second subset each comprising a plurality of the content recommendation entries.

* * * * *